United States Patent [19]
Speksnijder et al.

[11] Patent Number: 5,897,998
[45] Date of Patent: Apr. 27, 1999

[54] METHOD FOR MANIPULATING AVIAN EGGS

[75] Inventors: Gordon Speksnijder, Athens; Robert Ivarie, Watkinsville, both of Ga.

[73] Assignee: The University of Georgia Research Foundation, Inc., Athens, Ga.

[21] Appl. No.: 08/905,516

[22] Filed: Aug. 4, 1997

[51] Int. Cl.$^6$ .............................. C12N 5/00; A01K 45/00
[52] U.S. Cl. .............................. 435/349; 435/325; 800/2; 119/68
[58] Field of Search ................................ 435/325, 349; 800/2; 119/6.8

[56] References Cited

U.S. PATENT DOCUMENTS

| | | | |
|---|---|---|---|
| 3,120,834 | 2/1964 | Goldhaft et al. | 119/6.8 |
| 3,256,876 | 6/1966 | Nicely et al. | 119/6.8 |
| 4,917,045 | 4/1990 | Wiegand et al. | 119/6.6 |
| 4,973,595 | 11/1990 | Robel | 514/345 |
| 5,011,780 | 4/1991 | Perry | 435/317.1 |
| 5,162,215 | 11/1992 | Bosselman et al. | 435/172.3 |
| 5,438,954 | 8/1995 | Phelps et al. | 119/6.8 |
| 5,444,045 | 8/1995 | Francis et al. | 514/12 |
| 5,722,342 | 3/1998 | Line et al. | 119/6.8 |

OTHER PUBLICATIONS

Petite et al. Development. vol. 108, pp. 185–189, 1990.
Bosselman et al. Science. vol. 243, pp. 533–535, 1989.
Marzullo, Nature. vol. 225, pp. 72–73, 1970.
Mountney. Poultry Products Technology, 2nd ed., p. 293, 1980.
Marzullo, G., "Production of Chick Chimaeras", *Nature*, 225:72–73 (1970).
Bosselman et al., "Germline Transmission of Exogenous Genes in the Chicken", *Science*, 243:533–535 (1989).
Perry, M., "A complete culture system for the chick embroyo", *Nature*, 331:70–72 (1988).
Petitte et al., "Production of somatic and germline chimeras in the chicken by transfer of early blastodermal cells", *Development*, 108:185–189 (1990).
Carsience et al., "Germline chimeric chickens from dispersed donor blastodermal cells and compromised recipient embryos", *Development*, 117:669–675 (1993).
Fraser et al., "Efficient incorporation of transfected blastodermal cells into chimeric chicken embryos", *Int. J. Dev. Biol.* 37:381–385 (1993).
Vick et al., "Transgenic birds from transformed primordial germ cells", *Proc. R. Soc. Lond. B,* 251:179–182 (1993).
Ono et al., "A Complete Culture System for Avian Transgenesis, Supporting Quail Embryos from the Single–Cell Stage to Hatching", *Dev. Biol.,* 161:126–130 (1994).
Thoraval et al., "Germline transmission of exogenous genes in chickens using helper–free ecotropic avian leukosis virus––based vectors" *Transgenic Res.,* 4:369–376 (1995).
Fineman et al., "Animal Model: Dysmorphogenesis and Death in a Chicken Embryo Model," *American Journal of Medical Genetics,* 27:543–552 (1987).
Fineman et al., "Animal Model: Causes of Windowing–Induced Dysmorphogenesis (Neural Tube Defects and Early Amnion Deficit Spectrum) in Chicken Embryos," *American Journal of Medical Genetics,* 25:489–505 (1986).
Fisher et al., "The Use of Early Chick Embryos in Experimental Embryology and Teratology: Improvements in Standard Procedures," *Teratology,* 27:65–72 (1983).

*Primary Examiner*—Leon B. Lankford, Jr.
*Assistant Examiner*—Christopher R. Tate

[57] ABSTRACT

This invention provides a method for manipulating the contents of eggs. An opening is made in the egg shell, without breaking the underlying egg shell membrane, and an aqueous liquid is deposited over the opening such that the opening is completely covered. The underlying egg shell membrane is then cut away. The introduction of air bubbles into the interior of the egg upon cutting of the underlying egg shell membrane is prevented by the drawing of the aqueous liquid into the opening. A desired solution may be microinjected through the opening and the opening sealed.

18 Claims, No Drawings

METHOD FOR MANIPULATING AVIAN EGGS

BACKGROUND OF THE INVENTION a) Field of the Invention

The present invention relates to a method of manipulating eggs, particularly fertilized eggs.

b) Description of related art

The hard egg shell and large yolky egg of the avian embryo pose a significant obstacle to manipulating the embryo. When laid, the avian embryo consists of a blastoderm containing 30,000–60,000 cells on top of the yolk and encased in a hard calcified egg shell. Immediately below the shell is the egg shell membrane which surrounds the egg white, the egg yolk and the developing embryo. Many procedures, including transgenic modification of the avian genome, require access to the interior of the egg. For example, to modify the genetic material of a chicken, a small volume of liquid containing retroviral transducing particles or transfected donor cells must be injected into the subgerminal cavity of the recipient embryo. In addition, it may be desirable to expose the developing embryo to antigens, viruses, vaccines, or growth factors.

To provide access to the interior of the egg and the embryo, typically a hole or "window" is made in the egg shell. Petitte et al. (*Development* 108:185–89 (1990)) and Bosselman et al. (*Science* 243:533–35 (1989); U.S. Pat. No. 5,162,215) use a grinding tool, such as a Dremel, to grind a 5–8 mm hole in the egg shell. The underlying egg shell membrane is then cut away with a scalpel and 2–10 microliters of experimental solution is microinjected into the embryo. The hole is then sealed in one of several ways. Usually, the hole is covered with fresh egg shell membrane from a donor egg, with the membrane applied in the same orientation as in the egg, i.e, albumen-side down. When the membrane dries, it is permanently sealed with plastic model cement or a gas permeable surgical membrane. See also Carsience et al. (*Development* 117:669–75 (1993)), and Fraser et al. (*Int. J. Dev. Biol.* .37:381–85 (1993)).

Other similar methods have been used to access the developing embryo. Thoraval et al. (*Transgenic Res.* 4:369–76 (1995)) remove a triangular piece of shell, inject 10 ul of experimental solution through the opening into the embryo, then seal the egg by replacing the shell piece and covering it with adhesive tape. Marzullo (*Nature* 225:72–3 (1970)) cuts a hole in the shell, covers it with a glass cover slip, and seals it with paraffin wax.

The hatch rate of viable chicks following egg manipulations is an important concern, for often the objective of the egg manipulation process is the production of a genetically altered chick. For example, transgenic avians may be produced by injecting retroviral transducing particles or transfected donor cells into the embryo, and allowing the embryo to develop normally to hatching. As noted below, it is well known in the field that less than 10% of fertilized eggs hatch following manipulations that require opening of the shell. By contrast, greater than 90% of unmanipulated eggs will hatch if the eggs are from flocks that are at peak production. Work in several laboratories indicates that it is the opening procedure that decreases hatchability, not the injections.

Marzullo (1970) first reported the high mortality associated with opening the egg, noting that only 7% of embryos of windowed and injected eggs reached day 15 of incubation. Thoraval et al. (1995; *Poultry Sci.* 73:1897–1905 (1994)) also found that 2.3–7.3% of opened and injected eggs hatched; uninjected, windowed eggs had a similar hatching rate, suggesting that the opening procedure caused the low hatching rate. Petitte et al. (1990) reported that 4 out of 53, or 7.6%, of windowed and injected eggs hatched; hatchability was the same without injection, indicating that the windowing procedure per se was responsible for the low hatch rate. Although Bosselman et al. (1989) reported a hatch rate of 38% using essentially the same method as Petitte et al., consistently obtaining hatch rates over 10% continues to be problematic.

Surrogate shell methods have been developed to provide access to embryos and to improve hatch rates. Developing embryos, with or without genetic manipulation, are collected at various ages and transferred to "ex ovo" containers. Generally, 2 or 3 transfers are required as the embryo develops, and the last transfer consists of placing the embryo in a fresh donor egg shell with a large hole cut in the blunt end. Using these methods, Perry (*Nature* 331:70–73 (1988); U.S. Pat. No. 5,011,780) and Ono et al.(*Dev. Biol.* 161:126–30 (1994)) observed hatch rates greater than 25% for chicken and quail embryos, respectively. Unfortunately, this method is labor intensive and may prove rate-limiting if very large numbers of injections are necessary to produce viable transgenic chicks.

The surrogate shell method has also been combined with standard egg-opening methods. After windowing and injecting as described by Petitte et al. (1990), eggs are incubated for 3 days in standard incubators and the embryo is transferred to a surrogate shell which is sealed with gas permeable film as described in U.S. Pat. No. 5,011,780. This approach yields hatch rates of greater than 25%; however it is also labor intensive.

It would be desirable to provide an improved method for increasing the hatchability of eggs subjected to manipulation.

SUMMARY OF THE INVENTION

This invention provides a method for manipulating the contents of eggs. An opening is made in the egg shell, without breaking the underlying egg shell membrane, and an aqueous liquid is deposited over the opening such that the opening is completely covered. The underlying egg shell membrane is then cut away. The introduction of air bubbles into the interior of the egg upon cutting of the underlying egg shell membrane is prevented by the drawing of the aqueous liquid into the opening. A desired solution may be microinjected through the opening and the opening sealed.

An advantage of the invention is improved hatchability of fertilized eggs following manipulation. The egg is manipulated as described above and incubated to allow development of the embryo. The incubation is maintained until the embryo is hatched from the egg.

Suitable eggs are avian eggs including, but not limited to, eggs of the ratite, chicken, turkey, quail, duck, pheasant and goose. The egg may contain an embryo.

The invention is suitable for any commercial application requiring microinjection of a solution. For example, genetically modified cells, attenuated viruses, antigens, growth factors and cytokines may be microinjected. The invention provides improved hatchability following the incubation of manipulated fertilized eggs. This aspect may be useful when large numbers of injections are required, for example, in the production of genetically manipulated and transgenic animals.

DETAILED DESCRIPTION OF THE INVENTION a) Definitions and General Parameters

The following terms are set forth to illustrate and define the meaning and scope of the various terms used to describe the invention herein.

"Avian" refers to any avian species, including but not limited to ratite, chicken, turkey, quail, goose, pheasant, and duck.

"Hatchability" refers to the fraction of fertilized eggs that hatch a viable chick.

"Blastoderm" refers to the disc of cells overlying the subgerminal cavity usually containing 30,000–60,000 cells at oviposition.

b) Egg Manipulation

This invention provides a method for manipulating the contents of eggs. The egg manipulation comprises obtaining an egg, making an opening in a shell of the egg without breaking the underlying egg shell membrane, depositing an aqueous liquid over the opening such that the opening is completely covered, cutting an opening in the egg shell membrane, microinjecting a solution through the opening, and sealing the opening after microinjecting, whereby no air bubbles are introduced into the interior when the underlying egg shell membrane is cut.

The egg to be manipulated may contain an embryo at the blastoderm stage or later. The egg may be an avian egg selected from the group consisting of ratite, chicken, quail, duck, pheasant and goose. Preferably the egg is a chicken egg.

The aqueous liquid may be any suitable aqueous liquid, including an aqueous solution having a pH from about 6 to about 9 and an osmolarity from about 50 to about 400 mOsm/kg $H_2O$. The aqueous liquid may be, but is not limited to, an avian albumen solution, phosphate buffered saline, tissue culture media and distilled water. Avian albumen solution comprises albumen from a comparably aged donor egg, which may be further diluted by water or an appropriate salt solution. Examples of tissue culture media include but are not limited to Dulbecco's Modified Eagle's Medium (DMEM) and Medium M199. The skilled practitioner will recognize which medium is appropriate. The aqueous solution may further contain an antibiotic. A presently preferred antibiotic is 100 international units of penicillin and 100 $\mu$g/ml of streptomycin.

The microinjection through the opening of an embryo-containing egg may be into the area around and in close proximity to the embryo.

Another aspect of this invention is improved hatchability following the manipulation as described above of an egg which contains an embryo. The sealed microinjected egg is incubated to allow development of the embryo. The incubation is maintained until the embryo is viably hatched from the egg.

One embodiment of the invention comprises a method for manipulating a chicken egg containing a blastoderm. The method comprises obtaining a laid avian egg which has been stored at 6° C. usually for not more than two days and contains a blastoderm, making an opening in the shell of the egg without breaking the underlying egg shell membrane, depositing an effective amount of an aqueous liquid over the opening such that the opening is completely covered, cutting an opening in the egg shell membrane, microinjecting a solution through the opening into the area around and in close proximity to the blastoderm, and sealing the opening after microinjecting. No air bubbles are introduced into the interior when the underlying egg shell membrane is cut since the aqueous liquid is drawn into the opening.

In another embodiment, the invention further includes the step of exposing the egg to gamma-radiation prior to opening the shell.

Another aspect of the invention is improved hatchability following the manipulation as described above of an avian egg which contains a blastoderm. The sealed microinjected egg is incubated to allow development of the embryo. The incubation is maintained until the embryo is viably hatched from the egg.

c) Examples

The following specific examples are intended to illustrate the invention and should not be construed as limiting the scope of the claims.

EXAMPLE 1

Egg manipulation

The eggs were manipulated as follows. Freshly laid, fertile White Leghorn and Barred Rock chicken eggs were stored at 6° C. for 1 or 2 days. Some eggs were exposed to 500 Rads of gamma-radiation prior to manipulation. The entire surface of an egg was wiped with 70% ethanol to sterilize it. The egg was placed horizontally with respect to its long axis in an egg rack for 3 hours at room temperature to allow the blastoderm to rotate to the top. A 5–8 mm round hole was made in the top of the shell by drilling an opening with a drilling tool fitted with an abrasive rotating tip which can drill a hole in the eggshell without damaging the underlying egg shell membrane. A Dremel moto-tool (MiniMite #750) fitted with an aluminum oxide spherical grinding stone (Dremel, #925) was used. Care was taken not to break the underlying egg shell membrane. Following drilling, the round hole was wiped with 70% ethanol and allowed to dry. About 0.5–1 ml of phosphate-buffered saline or tissue culture medium was deposited as a droplet around and above the hole such that the exposed egg white membrane was completely covered. As a precaution against infection, the phosphate-buffered saline or tissue culture medium contained 100 international units of penicillin and 100 $\mu$g/ml of streptomycin. The shell membrane was cut cleanly free from the inside edge of the hole using a #11 scalpel blade. Ragged edges were avoided by cutting just beneath the edge of the egg shell. Once the egg shell membrane was pierced, part of the overlying liquid was drawn completely into the egg, preventing the entry of air bubbles. The solution was left in place during the remaining procedure so that no air bubbles were ever introduced into the interior of the egg. After microinjection of a small amount of experimental solution into the area around and in close proximity to the blastoderm, the hole was sealed by covering the hole with an approximately 1 square cm of fresh egg shell membrane from a donor egg. Care was taken to ensure that the orientation of the shell membrane was albumen side down and shell side up. Once the egg shell membrane dried to whiteness, the patch was completely covered with Duco cement (Devcon®) or a gas permeable surgical dressing (TegaDerm®).

EXAMPLE 2

Increased Hatchability following egg manipulation.

Hatchability was monitored by incubating the manipulated eggs and monitoring the percent that developed normally to hatch. Eggs manipulated as described in Example 1 were placed in a humidified incubator narrow end down and incubated until hatch. Humidity was maintained at between 51–53% and the temperature was 37.8° C. Three different incubators were used: a new Jamesway AVN, a modern NatureForm NOM 125 or an old Jamesway 252.

Following incubation, an average of 29.6% of manipulated eggs hatched (a low of 25% and a high of 34%, 504 trials). The hatch rate was not significantly different for manipulated eggs with and without injection and with and without gamma-irradiation. In addition, no significant differences were found among incubators. By contrast, an average of 61.2% of unmanipulated control eggs hatched (a low of 45% and a high of 69%, 407 trials). Note that these numbers were relatively low because the experimental flock was near the end of its egg-laying cycle.

EXAMPLE 3

Comparative Example

Hatch rate was also compared to that of eggs manipulated using the prior art method described by Petitte et al (1990) and Bossselman et al. (1989). Briefly, eggs were treated as in Example 1 except that the step of placing a small amount of solution around and above the hole was omitted. Rather, the egg shell membrane was pierced directly after the hole was drilled in the egg shell. Using this method, an average of 2.8% of eggs hatched (424 trials).

In these experiments the new method has been shown to increase hatchability of manipulated eggs by a factor of ten.

What is claimed is:

1. A method of manipulating an avian egg comprising:
    a) obtaining an avian egg;
    b) making an opening in the shell of the avian egg without breaking the underlying egg shell membrane;
    c) depositing an aqueous liquid over the opening in the shell such that both the opening in the shell and the exposed egg shell membrane are completely covered;
    d) cutting an opening in the egg shell membrane, wherein said opening in the egg shell membrane is completely covered by the aqueous liquid;
    e) microinjecting solution through the opening in the egg shell membrane;
    f) sealing the openings in the egg shell membrane and shell after microinjecting.

2. The method of claim 1 wherein the avian egg contains an embryo.

3. The method of claim 2 wherein the embryo is at the blastoderm stage or later.

4. The method of claim 2 wherein the microinjection through the opening is into the area around and in close proximity to the embryo.

5. The method of claim 1 wherein the avian egg is selected from the group consisting of ratite, chicken, quail, duck, pheasant and goose.

6. The method of claim 5 wherein the avian egg is a chicken egg.

7. The method of claim 1 wherein the pH of the aqueous liquid is from about 6 to about 9 and the osmolarity from about 50 to about 400 mOsm/kg $H_2O$.

8. The method of claim 1 wherein the aqueous liquid is selected from the group consisting of avian albumen solution, phosphate buffered saline, tissue culture medium and water.

9. The method of claim 1 wherein the aqueous liquid further contains an antibiotic.

10. A method for increasing hatchability after manipulating an avian egg containing an embryo comprising:
    a) obtaining an avian egg;
    b) making an opening in the shell of the avian egg without breaking the underlying egg shell membrane;
    c) depositing an aqueous liquid over the opening in the shell such that both the opening in the shell and the exposed egg shell membrane are completely covered;
    d) cutting an opening in the egg shell membrane, wherein said opening in the egg shell membrane is completely covered by the aqueous liquid;
    e) microinjecting a solution through the opening in the egg shell membrane;
    f) sealing the openings in the egg shell membrane and shell after microinjecting;
    g) incubating the sealed microinjected avian egg to allow development of the embryo; and
    h) maintaining the incubation until the embryo is viably hatched from the avian egg.

11. The method of claim 10 wherein the avian egg is selected from the group consisting of ratite, chicken, quail, duck, pheasant and goose.

12. The method of claim 11 wherein the avian egg is a chicken egg.

13. The method of claim 10 wherein the embryo is a blastoderm stage or later.

14. The method of claim 10 wherein the pH of the aqueous liquid is from about 6 to about 9 and the osmolarity from about 50 to about 400 mOsm/kg $H_2O$.

15. The method of claim 10 wherein the aqueous liquid is selected from the group consisting of avian albumen solution, phosphate-buffered saline, tissue culture medium and water.

16. The method of claim 10 wherein the aqueous liquid further contains an antibiotic.

17. The method of claim 10 wherein the microinjection through the opening is into the area around and in close proximity to the embryo.

18. In a method for manipulating an avian egg containing an embryo, which method requires removing a portion of the egg shell to create a hole exposing the underlying egg shell membrane and then piercing the exposed egg shell membrane, the improvement comprising depositing an aqueous liquid over the hole after forming said hole in the egg shell such that the hole opening is completely covered by the aqueous liquid prior to piercing the exposed egg shell membrane.

* * * * *